United States Patent Office 2,813,127
Patented Nov. 12, 1957

---

2,813,127

DIPEROXIDES

Ellis R. White, Oakland, Calif., assignor to Shell Development Company, New York, N. Y., a corporation of Delaware No Drawing. Application April 19, 1956,
Serial No. 579,167

15 Claims. (Cl. 260—610)

This invention relates to a novel class of organic peroxides and to processes for preparing the same. More particularly, it relates to organic diperoxides which may be formed by the interaction of an organic hydroperoxide with a bis-(halomethyl)-tetrahydrocarbon substituted benzene.

The novel products of this invention are characterized by improved stability to heat, i. e., being less volatile, and therefore are particularly useful in the vulcanization of rubber. They are additionally useful as resin polymerization catalysts for vinyl, vinylidine and vinylene compounds. Further, the products of this invention provide useful starting materials for the preparation of other useful compounds as will hereinafter appear.

More specifically this invention embodies a novel class of organic diperoxides of the general formula

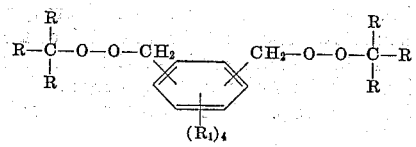

wherein R and R₁ represent the same or different hydrocarbyl radicals.

The process by which the novel products of this invention are formed comprises the reaction of a hydroperoxide and a bis-(halomethyl)-tetrahydrocarbyl substituted benzene in the presence of a base.

The peroxide may be selected from any organic tertiary hydroperoxide of the general formula

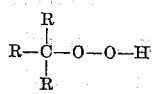

wherein each R represents the same or different hydrocarbyl radicals which may or may not be further substituted. Any hydroperoxide in which the organic radical is attached to the hydroperoxy radical via a tertiary carbon atom may be used as one of the reagents or reactants in the manufacture of the novel class of peroxides in accordance with the process of the present invention. A particularly suitable group of such hydroperoxides includes or comprises tertiary alkyl hydroperoxides. The following are illustrative examples of such tertiary alkyl hydroperoxides which may be used as one of the reactants in the manufacture of the novel peroxides in accordance with the process of the present invention: tertiary butyl hydroperoxide, tertiary amyl hydroperoxide and their homologues and analogues, such as the tertiary alkyl hydroperoxides formed by the substitution of the hydroperoxyl (—O—O—H) radical for the hydrogen atom on one or more of the tertiary carbon atoms of such saturated aliphatic hydrocarbons as 2-ethyl butane, 2-methyl pentane, 3-methyl pentane, 2,3-dimethyl butane, 2,4-dimethyl pentane, and their homologues. Other tertiary hydroperoxides in this category include 3-methyl-3-hydroperoxypentane, 2-methyl-2-hydroperoxyoctane and 2-methyl-2-hydroperoxybutane. It is found that hydroperoxides of this type are particularly preferred, that is, where the Rs contain not more than 8 carbon atoms.

It is particularly preferred that the Rs of the hydroperoxide be all the same and contain not more than three carbon atoms. In this group is the most preferred species, tertiary butyl hydroperoxide. The tertiary hydroperoxide is not limited to those wherein the Rs are alkyl as they may also contain aromatic radicals as for example, cumene hydroperoxide, and the like.

In considering the scope of the hydroperoxides that may be used, it is found that the diperoxides described by the above formula may be formed irrespective of the substitutions on the tertiary carbon atoms carrying the peroxy group. This apparently has the single limitation that the Rs may not have any unsaturation in an acyclic chain although unsaturation may be present in a cyclic hydrocarbyl radical. In view of this consideration it may be said that the tertiary hydroperoxide may be selected from those wherein the carbon atom carrying the hydroperoxide is attached to three hydrocarbyl radicals free of acyclic unsaturation.

The other group of reactants, i. e., the bis-(halomethyl)tetrahydrocarbyl substituted benzene comprises such compounds as bis-(chloromethyl)trimethylethyl benzenes, bis-(chloromethyl)triethylmethyl benzenes, bis-(chloromethyl)durene, bis-(chloromethyl)prehnitene, bis-(chloromethyl)isodurene, bis-(chloromethyl)-3,6-dimethyl-4,5-diphenyl benzene, bis-(bromomethyl)-2-pentyl-6-ethyl-4,5-diphenyl benzene, bis-(chloromethyl)-1,2-diethyl-4,5-diphenyl benzene, bis-(chloromethyl)-1,2-diisopropyl-3,4-dipropyl benzene, bis-(iodomethyl)-1,2,3-trimethyl-4-toluyl benzene, bis-(chloromethyl)-1-methyl-4-ethyl-5-stearyl-6-phenyl benzene, bis-(chloromethyl)-1,3,5-trimethyl-6-naphthyl benzene and the like. In a preferred embodiment the four hydrocarbon substitutents are saturated lower alkyl radicals having up to 8 carbon atoms such as butyl, pentyl, hexyl, and the like. Particularly preferred are those wherein the hydrocarbon radicals are selected from lower alkyl of 1 to 2 carbon atoms such as the bis-(chloromethyl)trimethyl ethyl benzenes, the bis-(chloromethyl)triethyl methyl benzenes, the bis-(chloromethyl)dimethyl diethyl benzenes, and the like. Still more preferred are those wherein the radicals are the same and are selected from methyl and ethyl.

A known method for producing the bis-(halomethyl)-tetrahydrocarbyl substituted benzenes comprises the reaction of the tetrahydrocarbon substituted benzene with formaldehyde in the presence of a halogen acid. Preferably the halogen of the bis-(halomethyl)tetrahydrocarbyl substituted benzene is selected from bromine, iodine and chlorine, the last being most preferred. If the halogen atom is fluorine, there is a tendency to obtain a final product which contains a considerable quantity of a polymerized product thus making separation and purification of the final product unnecessarily difficult.

The reaction mechanism for production of the peroxides of the invention involves a splitting out of hydrogen halide with the joining of two peroxy linkages to the methylene groups of the poly-substituted benzene as indicated below:

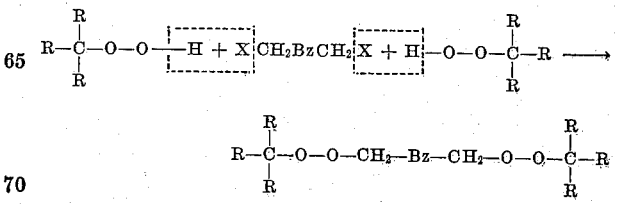

wherein X is halogen, Bz is the tetrahydrocarbyl substituted benzene and R is as previously indicated. From this reaction, it will be seen that the products of this invention are not limited by the nature of the hydrocarbyl radicals which are substituted on the benzyl nucleus.

In the preparation of the products of this invention the temperature of the reaction is governed by the decomposition temperature of the final product under the influence of alkali. In most instances it is found that decomposition begins at a reaction temperature in excess of about 85° C. For that reason a reaction temperature of 60–80° C. is preferred. At temperatures below 60° C. the reaction times become excessively long.

As the reaction is conducted in the presence of an organic solvent such as methanol, ethanol, propanol, isopropanol, and the like, the reaction temperatures may be effectively controlled by selecting a solvent having the desired boiling range. Also to be considered in conjunction with the solvent, is the need for the presence of an alkali to neutralize the hydrogen halide as it is formed. In view of this consideration, it is found that the solvent and the alkali may be effectively combined and added in the form of an alkali metal alcoholate, the alcohol being as indicated above. Thus, for example, a saturated solution of sodium ethanolate is preferred as it has a desirable reflux temperature. If higher boiling alcoholates are used, additional care will be required to prevent the reaction temperature from becoming too high. On the other hand if an alcoholate of methanol is used it will be desirable to use increased pressures in order to obtain more satisfactory reaction times. A saturated solution of the alcoholate is not essential although such a solution aids in facilitating temperature control. Therefore, it will be readily understood that solutions less than saturated may also be used.

As the final product has two peroxy groups attached to the substituted benzene, the ratio of the peroxide to the substituted benzene will be in the order of about 2:1. Preferably the peroxide is present in a slight excess, i. e., about 2.1–2.5. As the reaction progresses, the evolved hydrogen halide is neutralized with the alkali metal alcoholate. When the reaction is complete the hydrogen halide will have been neutralized by at least two moles of alkali for each mole of the substituted benzene or about 1 mole for each mole of the peroxide.

As a practical matter, however, the alkali metal is added in a slightly larger amount as it is found that the reaction should be conducted within certain preferred ranges of alkalinity in order to obtain maximum yields and desirable reaction times. If the alkalinity is too high, yields will be lower due to decomposition of the product. If the alkalinity is low, but still basic, longer reaction times will be required. It is found that decomposition is practically negligible when the reaction mixture is maintained in the basic region below pH 13. It is preferred that the pH be maintained in the range of about 9 to 11 as this range results in suitable reaction times and yet provides an adequate safety margin from too high a pH. Preferably, when the reactants are charged to the reaction vessel, only a sufficient quantity of the alcoholate is added to bring the pH to the desired range. As the reaction proceeds, the alkali metal is consumed in neutralizing the evolved hydrogen halide. It will be necessary, therefore, to add additional neutralizing agent as the reaction progresses. Control of the alkalinity may be accomplished by any conventional method such as by removing samples and determining the pH from time to time and then adding more alcoholate as required. Alternatively, a quantity of an indicator having the desired pH range of color change may be added to the reaction mixture. In that case, additional alcoholate is added as require as indicated by the color. Suitable indicators for this purpose include phenolphthalein, thymolphthalein, Alizarin Yellow, and Tropeolin O, the last being least preferred. Using the preferred condition described, the reaction times will normally range from 2 to 3 hours. Longer times may be required if the substituents on the benzene ring are of higher molecular weight.

After the reaction is complete, the solution is filtered while hot to separate alkali metal halide. The solution is then permitted to cool whereupon the product, if normally a solid, crystallizes out. The crystallized product is separated by decanting, filtering, or the like, and may then be recrystallized from any common solvent such as lower alcohols, saturated hydrocarbons, and the like. If the product is normally a liquid, separation may be accomplished by any conventional means such as distillation, selective extraction, or the like, provided the decomposition temperature of the product is not exceeded.

The following examples will illustrate the process of preparing the new products of this invention. It will be understood, however, that the examples are for purposes of illustrating the invention and are not intended as limitations thereto.

*Examplee I*

A reaction vessel equipped with an agitator, reflux condenser, inlet, outlet, thermometer and heating and cooling means, is charged with 230 parts of bis-(chloromethyl) durene, 189 parts of tertiary-butyl hydroperoxide and 1000 parts of isopropanol. The mixture is adjusted to pH 10.0 with saturated sodium methanolate. The temperature is slowly raised to reflux and maintained at this temperature for 2½ hours. During this interval, samples are removed at about 15 minute intervals and the pH is determined whereupon additional alcoholate is added to the reaction vessel to maintain the pH in the range of 9.5 to 10.5. When the reaction is complete, the mixture is filtered while hot using a filter aid such as diatomaceous earth. The solution is then cooled whereupon the product, a white solid, identified as bis-tertiary-butylperoxymethyl) durene precipitates. The yield is about 72% of a crystalline product having a melting point of 122° C., and having the following analysis: molecular weight 338; carbon, 71% (theory 69%); hydrogen, 10.2% (theory 10.05%).

*Example II*

The procedure of Example I is repeated using bis-(chloromethyl) prehnitene to replace bis-(chloromethyl) durene. The final product is identified as bis-(tertiary-butylperoxymethyl) prehnitene.

*Example III*

The procedure of Example I is repeated using bis-(chloromethyl) isodurene to produce bis-(peroxybutyl) dimethyl isodurene.

*Example IV*

To a reaction vessel equipped as in Example I is charged 230 parts of bis-(chloromethyl)durene, 248 parts of 3-methyl-3-hydroperoxy pentane, solvent and phenolphthalein. A quantity of saturated sodium ethanolate is then added to bring the mixture to a pink color. Phenolphthalein is again added until a deep pink color is obtained. Thereafter the temperature of the mass is raised to and maintained at reflux for a period of about 3 hours. Periodically additional sodium ethanolate is added to maintain the reaction mixture at a pink color. When the reaction is complete the mixture is filtered while hot with a common filter aid and then permitted to cool whereupon there is precipitated a compound identified as bis-(3-methylpentyl-3-peroxymethyl)durene.

Substantially the same results are obtained using other alkali alcoholates such as potassium and lithium. Example IV is repeated using as a starting material bis-(bromomethyl)durene.

*Example V*

The procedure of Example I is repeated using the following reactants:

Parts

Bis-(chloromethyl)-2,3,5-trimethyl-6-ethyl benzene__ 244
Tertiary butyl peroxide_____ 189

The final product is identified as 1,4-bis-(tertiary butylperoxymethyl)-2,3,5-trimethyl-6-ethylbenzene.

By following the procedure of Example V, products corresponding to the diperoxides are produced by replacing the tetrahydrocarbon substituted benzene with others such as 1,4-dichloromethyl-2,3,5-triethyl-6-methyl benzene, and the like.

Unsaturated organic compounds having a single polymerizable olefinic linkage, e. g., styrene, alpha-methyl styrene, many vinyl and allyl derivatives, and the nitriles and many esters of acrylic and alpha-substituted acrylic acids, all of which fall within the class of unconjugated unsaturated polymerizable organic compounds, may be effectively polymerized in the presence of the novel diperoxides of this invention to produce resins and resin-like substances. Groups of unconjugated unsaturated compounds having two or more polymerizable non-conjugated double bonds between carbon atoms of aliphatic character which may be polymerized by the diperoxides of this invention are the unsaturated aliphatic polyesters of saturated polybasic acids, the unsaturated aliphatic polyethers of saturated polyhydric alcohols, and the unsaturated aliphatic esters of unsaturated aliphatic acids. Also included in this class are the polymerizable unsaturated compounds containing in the molecule one or more polymerizable organic radicals and one or more inorganic radicals or elements. Examples of such compounds are the vinyl, allyl and methallyl esters of phosphoric acid and of the ortho acids of silicon, boron, etc.

Another important group of compounds which may be polymerized by the novel diperoxide compounds of the present invention includes polymerizable compounds having two or more and preferably two conjugated unsaturated carbon-to-carbon linkages. These compounds are substantially hydrocarbon in character, although they may contain substituents such as halogen, nitro, sulfo, etc. By far the most important subgroup of such compounds comprises the hydrocarbons and substituted hydrocarbons having in the molecule two double bonds in conjugated relationship to one another, these double bonds being between carbon atoms of aliphatic character. Representative examples of such compounds are butadiene-1,3, 2-chlorobutadiene-1,3, isoprene, and the higher homologues thereof. In general, the polymerization of conjugated diene hydrocarbons and substituted hydrocarbons in accordance with the invention results in products which are synthetic elastomers in character and as a consequence belong to the general group of substances known as synthetic rubbers.

The novel compounds of the invention are applicable to the polymerization of single compounds of the above-outlined groups and to the co-polymerization of two or more compounds; for instance in the production of compounds which are synthetic elastomers in character, one or more of the conjugated diene hydrocarbons may be polymerized in the presence of the novel diperoxide catalysts with one or more of the polymerizable unsaturated compounds of the type of styrene, acrylonitrile, isobutylene, vinyl chloride, methyl methacrylate, and the like. Synthetic resins usually require the addition of one or more plasticizers, stabilizers, lubricants, dyes, pigments, fillers, or other modifiers. Where these modifiers do not chemically react with or otherwise adversely affect the ingredients of the reaction mixture, they may be added to the monomer or other partially polymerized material during the polymerization reaction. Additionally, the novel peroxides of this invention are found to be particularly useful for the vulcanization of synthetic rubber stock and also for the vulcanization of natural rubbers.

The novel diperoxides of the present invention may be used as the polymerization catalysts either alone or in combination with one another or with other catalysts such as benzoyl peroxide, lauroyl peroxides, acetyl peroxide, benzoyl acetyl peroxide and hydrogen peroxide. The catalysts of the invention are ordinarily dissolved in the polymerizable compounds prior to polymerization. Amounts of catalysts as small as a fraction of a percent based on the weight of the monomer are catalytically effective. Larger percentages have correspondingly greater effect. Too much catalyst is generally to be avoided as likely to render the reaction violent or as adversely affecting the properties of the polymer, particularly as to molecular weight and the ramifications thereof. The amount of catalyst ordinarily varies from about 0.01% to about 5% or more by weight of the monomer.

The polymerization may be carried out in a continuous or discontinuous manner, under atmospheric, superatmospheric or reduced pressures. The polymerization will usually be energized by the application of heat, although both heat and light may be used. The invention may be applied to monomeric compounds in the massive state or to dispersions or solutions of the monomer or monomers. Where the dispersion method is employed it is normally desirable to select a dispersing medium insoluble in the catalyst involved. In general, the temperatures customary for similar polymerization reactions under the influence of other catalysts, e. g., benzoyl peroxide, may be used. Depending upon the particular material and the conditions involved, temperatures of from about 80° C. to about 200° C. may be used with temperatures of about 125° C. being preferred. This usually, although not necessarily, involves the use of superatmospheric pressures.

I claim as my invention:

1. A process for preparing diperoxides comprising reacting a tertiary organic hydroperoxide and a bis-(halomethyl)tetrahydrocarbon substituted benzene, said reaction being conducted in a basic medium at below about 85° C. and in the presence of an inert solvent.

2. A process for preparing diperoxides comprising reacting a tertiary alkyl hydroperoxide and a bis-(halomethyl)tetrahydrocarbon substituted benzene in a basic medium, said reaction being conducted at below about 85° C. and in the presence of an inert solvent.

3. The process of claim 1 in which the peroxide is tertiary butyl peroxide and the tetrahydrocarbon substituted benzene is a bis-(chloromethyl)tetramethyl benzene.

4. The process of claim 3 in which the tetramethyl benzene is durene.

5. The process of claim 3 in which the tetramethyl benzene is prehnitene.

6. The process of claim 3 in which the tetramethyl benzene is isodurene.

7. The process of claim 1 in which the peroxide is tertiary butyl peroxide and the poly-substituted benzene is a bis-(chloromethyl)-trimethylethyl benzene.

8. The process of claim 7 in which the substituted benzene is bis-(chloromethyl)2,3,5-trimethyl-6-ethyl benzene.

9. A ditertiary peroxide of bis-(methyl)tetrahydrocarbon substituted benzene, the peroxide radicals being linked to the methylene radicals.

10. A ditertiary peroxide of bis-(methyl)tetraalkyl substituted benzene, the peroxide radicals being linked to the methylene radicals, said alkyl having from 1 to 8 carbon atoms.

11. Bis-(t-butylperoxymethyl)durene.

12. Bis-(t-butylperoxymethyl)isodurene.

13. Bis-(t-butylperoxymethyl)prehnitene.

14. Bis - (t - butylperoxymethyl) - 2,3,5 - trimethyl - 6 - ethyl benzene.

15. Bis - (t - butylperoxymethyl) - 2,3,4 - trimethyl - 5 - ethyl benzene.

References Cited in the file of this patent

UNITED STATES PATENTS

| | | |
|---|---|---|
| 2,139,369 | Kyrides | Dec. 6, 1938 |
| 2,455,569 | Dickey | Dec. 7, 1948 |
| 2,567,615 | Milas | Sept. 11, 1951 |
| 2,628,256 | Campbell | Feb. 10, 1953 |